Patented June 16, 1953

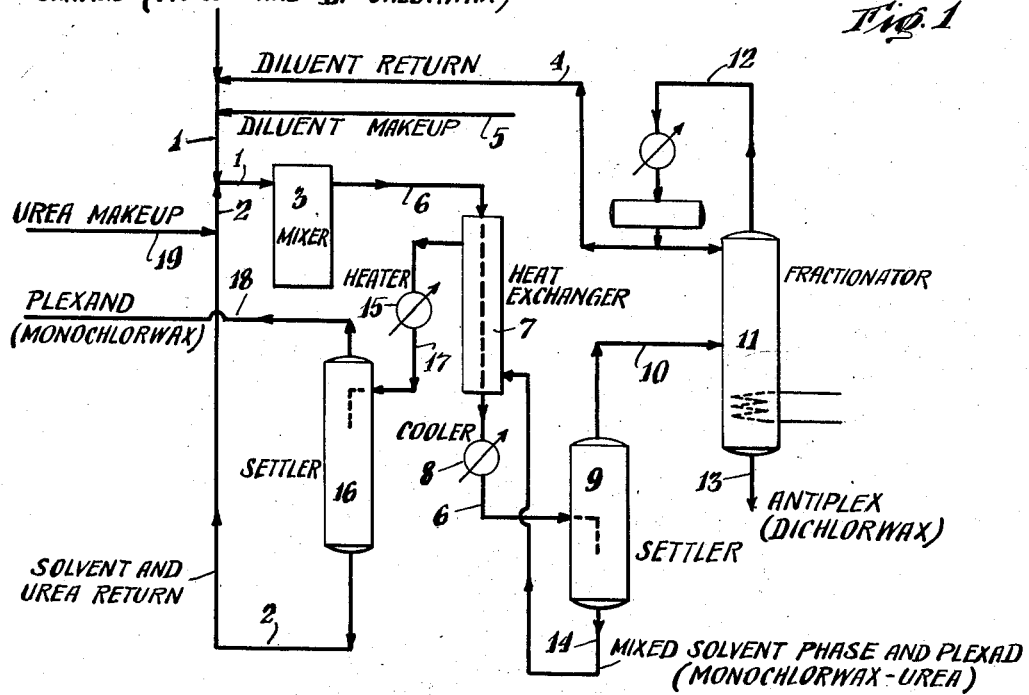
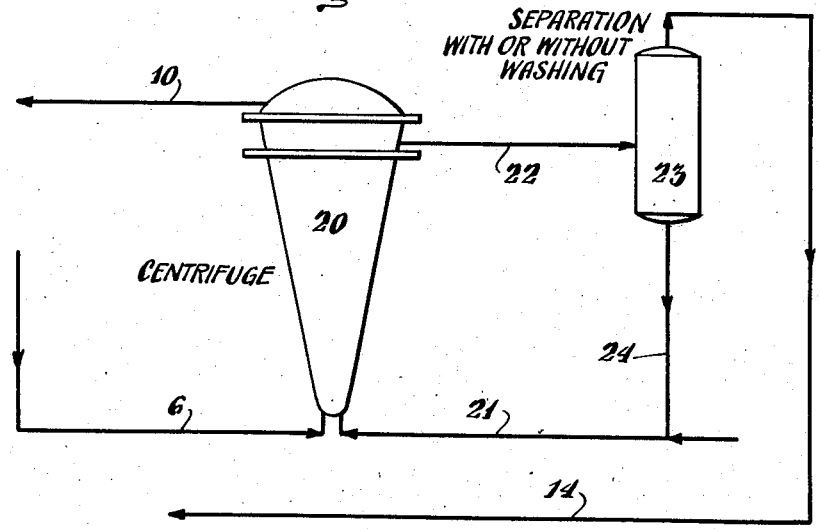

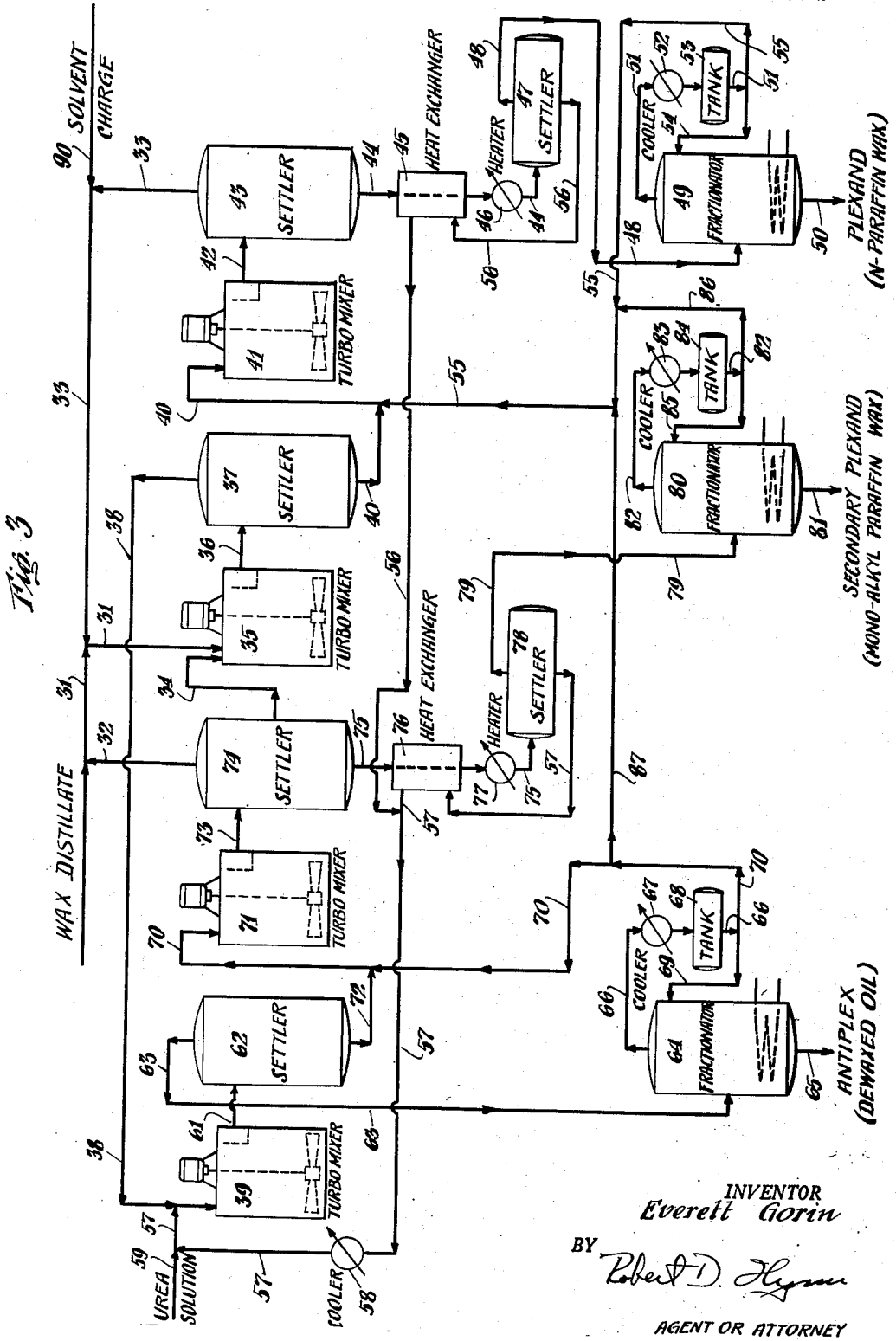

2,642,422

UNITED STATES PATENT OFFICE 2,642,422

SEPARATION OF HYDROCARBONS AND HYDROCARBON DERIVATIVES

Everett Gorin, Castle Shannon, Pa., assignor to Socony-Vacuum Oil Company, Incorporated, a corporation of New York Application September 13, 1949, Serial No. 115,513

15 Claims. (Cl. 260—96.5)

This invention has to do with the separation of hydrocarbons and hydrocarbon derivatives of different molecular configuration from mixtures containing the same, and also has to do with the preparation of new and novel compositions.

I. FIELD OF INVENTION

Numerous processes have been developed for the separation of hydrocarbons and hydrocarbon derivatives of different molecular configuration by taking advantage of their selective solubility in selected reagents or solvents from which they may later be separated. Exemplary of hydrocarbon separation procedures is the Edeleanu process, wherein paraffinic materials are separated from aromatics by virtue of the greater solubility of aromatics in liquid sulfur dioxide. Lubricant oil solvent refining processes, solvent deasphalting, solvent dewaxing and the like are further examples of the separation of hydrocarbons of different molecular configuration. Typical of selective solvent procedures for separating hydrocarbon derivatives is the separation of paraffin wax, monochlorwax and polychlorwaxes, with acetone as the selective solvent.

This invention is concerned with the general field outlined above, but based upon a different and little-known phenomenon, namely, the differing ability of hydrocarbons and hydrocarbon derivatives to enter into and to be removed from certain crystalline complexes. As used herein, the term "complex" broadly denotes a combination of two or more compounds.

This invention is predicated upon the knowledge that urea forms complex crystalline compounds to a varying degree with various forms of hydrocarbons and hydrocarbon derivatives.

II. PRIOR ART

For some years it has been known that various isomers of aromatic hydrocarbon derivatives form complexes with urea. Kremann (Monatshefte f. Chemie 28, 1125 (1907)) observed that complexes, designated as "double compounds," of urea and the isomeric cresols are stable at different temperatures. Schotte and Priewe (1,830,859) later separated meta-cresol from the corresponding para isomer by selectively forming a meta-cresol-urea complex, which was described as an "addition compound"; the latter compound was separated from the para isomer and then split up by distillation or with water or acid to obtain pure meta-cresol. The "addition compound" of meta-cresol and urea was shown thereafter to have utility as a disinfectant (Priewe—1,933,757). Bentley and Catlow (1,980,901) found a number of aromatic amines containing at least one basic amino group capable of forming "double compounds" with certain isomeric phenols. It has also been shown that trans-oestradiol can be separated from the corresponding cis-compound by forming a difficultly soluble compound of urea and trans-oestradiol (Priewe—2,300,134).

The forces between urea and the compounds of the foregoing complexes are due to specific chemical interaction between the various functional groups.

One heterocyclic compound, 2:6 lutidine, has been found to form a crystalline compound with urea, thus affording a means of separating the lutidine from beta- and gamma - picolines (Riethof—2,295,606).

Comparatively few aliphatic hydrocarbon derivatives have been known to date to form complex compounds with urea. In German patent application B 190,197, IV d/12 (Technical Oil Mission, Reel 143; Library of Congress, May 22, 1946), Bengen described a method for the separation of aliphatic oxygen-containing compounds (acids, alcohols, aldehydes, esters and ketones) and of straight chain hydrocarbons of at least six carbon atoms from mixtures containing the same, the method being predicated upon the ability of such compounds and hydrocarbons to form "Additions-Produkt" with urea. In the Technical Oil Mission translation of the Bengen application, however, the urea complexes were designated "adducts," which term apparently stems from the anglicized "*addition product.*"

III. DEFINITIONS

From the foregoing discussion of prior art (II), it will be clear that a variety of terms have been applied to urea complexes. The latter have been rather loosely described as "double compounds," "addition compounds," "difficultly soluble compounds," "Additions-Produkt," and "adducts." All of these terms are somewhat ambiguous in that they have also been used to describe products or complexes of different character than the urea complexes under consideration. This is particularly so with the term "adduct," and the related term "unadducted material." While the term "adduct" is simple and convenient, it is an unfortunate designation, inasmuch as it confuses these complexes with other substances known in the chemical art. Specifically, "adduct" has been applied to Diels-Alder reaction products, formed by reaction of conjugated diolefins and olefins and their derivatives. As is well known, Diels- Alder products as a rule do not revert to their original constituents when heated or treated with water, acids, solvents, etc. Moreover, the term "adduct" has been defined earlier as "The product of a reaction between molecules, which occurs in such a way that the original molecules or their residues have their long axes parallel to one another." (Concise Chemical and Technical Dictionary.) Further ambiguity is introduced by the term "adduction," which has been defined as "oxidation." (Hackh.)

To avoid the foregoing conflicting terminology, several related terms have been coined to define with greater specificity the substances involved in the phenomenon under consideration. As contemplated herein and as used throughout the specification and appended claims, the following terms identify the phenomenon:

Plexad—a revertable associated complex comprising a plexor, such as urea, and at least one other compound; said plexad characterized by reverting or decomposing, under the influence of heat and/or various solvents, to its original constituents, namely, a plexor and at least one plexand.

Plexand—a compound capable of forming a plexad with a plexor, such as urea; compounds of this character differ in their capacity to form plexads, depending upon various factors described hereinafter.

Antiplex—a compound incapable of forming a plexad with a plexor.

Plexor—a compound capable of forming a plexad with a plexand, such as urea.

Plexate—to form a plexad.

Plexation—the act, process or effect of plexating.

IV. OUTLINE OF INVENTION

It has now been discovered that, by selective plexation with urea, a straight chain compound containing one non-terminal substituent can be separated, in the form of a plexad, from a mixture containing the same and a straight chain compound containing two or more non-terminal substituents. This separation procedure is effective when the compounds have the same or a different number of carbon atoms or have the same or different substituent groups.

The substituent groups which may characterize the compounds are inorganic and organic groups of the following character:

(a) Halogen: F, Cl, Br.
(b) Nitrogen-containing: $NH_2$, $CONH_2$, etc.
(c) Sulfur-containing: SH, etc.
(d) Oxygen-containing: OH, CHO, COOH, $H_3CCO$, $H_3CO$, $CH_2OH$, etc.
(e) Alkyl: methyl, ethyl, etc.
(f) Alkenyl: vinyl, etc.
(g) Haloalkyl: chlormethyl $ClCH_2$, etc.

As contemplated herein, the invention makes possible the separation of one or more plexands from a mixture containing the same, such plexand or plexands being separated in the form of a plexad or plexads, which, as described in detail hereinbelow, revert to the plexor, urea, and the plexand or plexands under certain conditions. The separation, therefore, is an excellent means for obtaining, in pure or concentrated form, one or more plexands or antiplexes which ever is the desired material. The invention also provides a means of forming new compositions of matter, namely, a number of plexads which may be used as a source of a plexor, urea, or as a source of a plexand.

V. OBJECTS

It is an object of this invention, therefore, to provide an effective means for separating hydrocarbons and hydrocarbon derivatives of different molecular configuration from mixtures containing the same.

It is also an object of this invention to selectively separate straight chain compounds having one non-terminal substituent from mixtures containing the same.

A further object is to separate a straight chain compound having one non-terminal substituent from a mixture containing the same and a straight chain compound of the same chain length and having two or more corresponding non-terminal substituents. A related object is the separation of a straight chain compound having one non-terminal substituent from a mixture containing the same and a straight chain compound of the same chain length and having two or more non-terminal substituents, no more than one of which is the same as the substituent of the mono-substituted compound.

An additional object is to separate a straight chain compound having one non-terminal substituent from a mixture containing the same and a straight chain compound of different chain length and having two or more corresponding non-terminal substituents. A related object is the separation of a straight chain compound having one non-terminal substituent from a mixture containing the same and a straight chain compound having two or more non-terminal substituents, no more than one of which is the same as the substituent of the mono-substituted compound.

Another important object is the separation of an unsubstituted straight chain compound, a straight chain compound having one non-terminal substituent and a straight chain compound having two or more non-terminal substituents from a mixture containing the same.

Another object is the separation of a poly-substituted compound having one terminal substituent and at least one non-terminal substituent and a poly-substituted compound in which all substituents are attached to non-terminal carbon atoms.

Still another object is the provision of a continuous method of separation of said plexands and antiplexes, which method is flexible, capable of relatively sharp separation, and not highly demanding of attention and of utilities such as heat, refrigeration, pumping power, and the like.

A further object is to provide a plexand or plexands substantially free of an antiplex or antiplexes. A corresponding object is the provision of an antiplex or antiplexes substantially free of said plexand or plexands.

Another object is to provide a new and novel class or sub-classes of plexads comprising a plexand and urea.

Other objects and advantages of the invention will be apparent from the following description.

VI. INVENTION IN DETAIL

As indicated above, it has been found that the foregoing objects are achieved by plexation with urea (a plexor) of a plexand or plexands.

(1) PLEXANDS

As defined above and in related application, Serial No. 115,511, filed concurrently herewith, a plexand is a compound capable of forming a plexad with a plexor, such as urea. Such compounds are defined in said related application by general Formula A:

(A)    $X(CH_2)_nCH_3$ wherein $n$ is a whole number and wherein X is a substituent group of the character described above, with $n$ and X being interrelated.

Another class of compounds contemplated in said application Serial No. 115,511 as secondary plexands are those having a non-terminal substituent, and being represented by general Formula B:

(B)    $H_3C(CH_2)_rCH(CH_2)_mCH_3$
                    $|$
                    $X$ wherein $r$ and $m$ are integers, the sum of which is at least four and is equal to or other than $n-2$, and $n$ and X are as defined above.

As contemplated herein, plexands are of the secondary type and are represented by general Formula B. The substituent group X may be any of the types outlined above subject, however, to one important restriction, namely, that of geometrical size. The "length" of the substituent group is of importance, and is the projection along the bond joining the group to the parent hydrocarbon from the center of the carbon atom to which the group is attached, to the center of the atom whose covalent radius shell extends furthest in the direction of said bond, plus the covalent radius of said bond. (Pauling—"Nature of The Chemical Bond"; Cornell University Press; Ithaca, N. Y.; 1939.) The "length" of the substituent group (X) roughly determines the minimum carbon chain length $(r+m+3)$ required for plexation of a secondary plexand, namely, a straight chain compound having one non-terminal substituent. The minimum chain length is also to some extent a function of the position substituted as well as of the chemical nature of the group. Thus, in compounds of this type, the minimum chain length required for plexation is determined by the length of group $H_3C(CH_2)_r-$, if $r$ is small enough so that this alkyl group is shorter in "length" than the substituent group (X). It is possible, bearing this relationship in mind, however, also to give rather wide limits in the correlation of group "length" with the minimum chain length required for plexation. The "lengths" of various groups are given in Table I, while the correlation of chain lengths with group "lengths" is given in Table II, provided below:

Table 1.—"Length" of various groups in Å.

| | |
|---|---|
| —F | 2.06 |
| —OH | 2.10 |
| —NH₂ | 2.17 |
| —CH₃ | 2.31 |
| —CH₂OH | 2.43 |
| —NO₂ | 2.61 |
| —CHO | 2.70 |
| —Cl | 2.76 |
| —SH | 2.85 |
| —Br | 3.05 |
| —CH₂Cl | 3.11 |
| —C₂H₅ | 3.19 |
| —CN | 3.25 |
| —SO₃H | 3.37 |
| —I | 3.43 |
| —COOH | 3.44 |
| -Cyclohexyl (average configuration) | 5.09 |
| -Phenyl | 5.69 |

Table II.—Correlation between "Length" of non-terminally substituted groups and minimum chain length required for urea plexation at 25° C.

| Group | "Length" in Å | Minimum Chain Length, Number of Carbon Atoms |
|---|---|---|
| 1 | <2.30 | 7–10 |
| 2 | 2.30–2.50 | 10–13 |
| 3 | 2.50–2.80 | 13–18 |
| 4 | 2.80–3.20 | 18–24 |
| 5 | >3.20 | >24 |

Representative secondary plexands are the following:

2-chloro-n-tetracosane;
2-bromo-n-tetracosane;
2-amino-n-decane;
2-nitro-n-octadecane;
Methyl hexyl carbinol (n-octanol-2);
2-ethylhexyl, n-octyl fumarate;
2-methyl-n-hexadecane, etc.

It has also been found that a disubstituted compound having one terminal substituent and one non-terminal substituent behaves in the same manner as the foregoing secondary plexands, which have only one substituent attached to other than a terminal carbon atom. These disubstituted compounds are represented by general Formula C:

(C)    $X'(CH_2)_{r+1}CH(CH_2)_mCH_3$
                        $|$
                        $X$ wherein $r$, $m$, and X are as defined above, and X' is the same as group X or is a different substituent.

Accordingly, compounds of the character of those represented by general Formula C, above, are considered as secondary plexands herein. Typical of such compounds are:

1,3-dichloro-n-octadecane;
1-chloro-2-methyl-n-hexadecane; etc.

Antiplexes do not form plexads, and include such compounds as those having two or more substituents attached to non-terminal carbon atoms, such as those represented by general Formula D:

(D)    $H_3C(CH_2)_sCH(CH_2)_tCH(CH_2)_uCH_3$
                    $|$      $|$      $|$
                    $X'$    $X''$   $X'''$ wherein $s$, $t$ and $u$ are integers and X', X'' and X''' are the same as group X defined above or are different X substituents.

It will be understood that the sum of $s$, $t$ and $u$ can be equal to the sum of $r$ and $m$ of general Formula B, above, or can be different. It will also be understood that X', X'' or X''' can be replaced by a hydrogen atom, in which case the antiplex is a disubstituted derivative. In the same connection, the integer $t$ can be zero, such that the antiplex is a disubstituted derivative. In addition, it is to be understood that X' and X'', or X' and X''', can be attached to the same internal carbon atom.

(2) PLEXOR

The plexor used herein is urea, which is in solution in a single- or multiple-component solvent. This solution should range from partially saturated to supersaturated at the temperature at which it is contacted with a plexand or with a mixture containing one or more secondary plexands and antiplexes, and, in many cases, it will be found convenient to suspend a further supply of urea crystals in the solution, handling it as a slurry. For gravity or centrifugal separation, it is convenient to use a solvent of such a specific gravity that after the formation of a desired amount of plexad, the specific gravity of the solvent phase will be different from that of the plexad phase and of the antiplex phase to a degree sufficient to permit separation by gravity, centrifuging, etc.

The solvent should be substantially inert to the plexand and to the compounds of the mixture and also to the urea. Preferably, it should also be heat stable, both alone and in contact with urea, at temperatures at which the desired plexad is not heat stable.

As indicated above, the solvent may be either single- or multiple-component. It is sometimes convenient, particularly where the plexad is separated by gravity, to utilize a two-component system, as water and an alcohol, glycol, amine or diamine, and preferably a lower aliphatic alcohol such as methanol or ethanol, or a water-soluble amine such as piperidine. Such a solvent, partially saturated to supersaturated with urea, lends itself readily to a continuous process for separation by plexation.

Solutions containing sufficient water in order to minimize the solubility of the hydrocarbon derivatives in the urea solvent are often employed. The minimum quantity of water required in such instances depends upon the polarity and the molecular weight of the hydrocarbon derivative, or secondary plexand, being treated and, in general, this quantity will be greater with more polar secondary plexands and with lower molecular weight compounds.

In certain cases the use of single-component solvents is advantageous. Single component solvents other than alcohols may be employed, although they are normally not as useful as the lower aliphatic alcohols. Glycols may be employed as single solvents, yet ethylene glycol is generally not suitable in gravity separation operations due to the high density of the urea-saturated solvent. The higher glycols and particularly the butylene glycols may be advantageously employed. Diamines such as diaminoethane, -propane and -butane may likewise be employed. Additional useful solvents include formic acid, acetic acid, formamide and acetonitrile, although the first three of these are subject to the same limitation as ethylene glycol.

Solvents generally useful when mixed with sufficient water, ethylene glycol or ethylene diamine, to render them substantially insoluble in the derivatives being treated, are selected from the class of alcohols such as methanol, ethanol, propanol, etc.; ethers such as ethylene glycol dimethyl ether; and amines such as triethylamine, hexylamine, piperidine. When gravity separation is employed, the mixed solvent is preferably subject to the restriction that the density after saturation with urea must be less than 1.0–1.1.

(3) TYPICAL SEPARATIONS

In order that this invention may be more readily understood, typical separations are described below with reference being made to the drawings attached hereto.

*(a) Separation of secondary plexand from antiplex*

The procedure which may be employed in effecting the separation of a paraffin derivative having one non-terminal substituent from a paraffin derivative having two or more non-terminal substituents may be essentially the same as that described in copending application Serial No. 4,997, filed January 29, 1948, of which this application is a continuation-in-part.

In Figure 1, a charge comprising a secondary plexand and an antiplex, for example, a monochlorinated paraffin wax and a dichlorinated paraffin wax in both of which the chlorine substituents are attached to non-terminal carbons, enters through line 1, to be contacted with urea solution from line 2, and the charge and solution are intimately mixed in mixer 3. In case the charge undergoing treatment is rather viscous at the temperature of plexad (monochlorwax-urea) formation, it is advisable to provide a diluent, such as, for example, a naphtha cut which may be recycled within the process, as described later, and joins the charge from line 4. Diluent make up is provided by line 5.

From mixer 3, wherein there is achieved an intimate mixture of urea solution and charge, the mixture flows through line 6, heat exchanger 7, and cooler 8 into settler 9. There may be some or a good portion of plexad (monochlorwax-urea) formed in mixer 3, but in general, it is preferred to operate mixer 3 at a temperature somewhat above that conducive to heavy formation of plexad. Then, in heat exchanger 7, the temperature of the mixture is reduced, and in cooler 8 adjusted, so that the desired plexad is formed. Temperatures employed depend upon the chain length of the secondary plexand and antiplex. If the chain length is such that it is not more than one or two carbon atoms greater than the minimum required to obtain plexation with the pure secondary plexand at 25° C., then temperatures in the range of $-10°$ C. to 20° C. should be employed. If the chain length is from two to six carbon atoms greater than the minimum, temperatures in the range of 15–30° C. should be employed; and if the chain length is greater than six carbon atoms beyond the minimum, temperatures from 25–50° C. may be employed. It will be apparent, then, that conditions of operation vary considerably, conditions selected being those appropriate for the formation of the desired plexad or plexads.

It will be recognized that this showing is diagrammatic, and that the heat exchangers and coolers, beaters, etc., shown will be of any type suitable, as determined by the physical characteristics of the materials being handled.

From cooler 8, the plexad-containing mixture flows into settler 9. This settler is preferably so managed that there is an upper phase of antiplex (dichlorwax), an intermediate phase of urea solution, and a lower region containing a slurry of plexad in the urea solution. The incoming mixture is preferably introduced into the solution phase, so that the antiplex (dichlorwax) may move upward and plexad downward, through some little distance in the solution to permit adequate separation of plexad from antiplex and antiplex from plexad.

Antiplex will be removed from settler 9 by line 10 and introduced into fractionator 11, wherein the diluent is removed, to pass overhead by vapor line 12 and eventually to use through line 4. Recovered antiplex (dichlorwax) passes from the system through line 13. Obviously, if no diluent be used, fractionator 11 will be dispensed with.

Plexad and urea solution, withdrawn from settler 9 through line 14 are passed through heat exchanger 7 and heater 15 to enter settler 16 through line 17. In this operation, the temperature is so adjusted, generally 10–20° C. higher than in mixer 3, that the secondary plexand (monochlorwax) is freed from the plexad and, in settler 16, the plexand rises to the top to be recovered from the system by means of line 18. The urea solution, thus reconstituted to its original condition by return to it of that portion of the urea which passed into plexad, is withdrawn from settler 16 by line 2 and returned to process. Naturally, in a process of this kind there are minor mechanical and entrainment losses of urea solution, etc., and urea solution make up is provided for by line 19.

In many cases, the separation of plexad and solution from antiplex may be conducted with greater facility in a centrifuge operation. Such a setup is shown in Figure 2, wherein only the equivalent of that portion of Figure 1 centering about settler 9 is reproduced. Again in diagram form, the cooled mixture containing antiplex, plexad and urea solution enters centrifuge 20 through line 6. In many cases, it will be desirable to utilize a carrier liquid in known manner in this operation and that liquid may be introduced by line 21. Antiplex will be carried out through line 10, and plexad, urea solution, and carrier, if present, pass through line 22 to a separation step, which may include washing and may be carried out in a settler, a filter, or another centrifugal operation, which separation is indicated diagrammatically at 23. Carrier liquid, if used, returns through line 24, and urea solution and plexad pass through line 14. (Note: Lines 6, 10 and 14 are the same lines, for the same functions, as in Figure 1 and are identically numbered.)

(b) *Separation of plexand, secondary plexand and antiplex*

In many applications of the invention, an unsubstituted straight chain paraffin, a plexand, is present in a mixture to be treated, together with a monosubstituted derivative, a secondary plexand, and a polysubstituted derivative, an antiplex. The process, therefore, is applied in such a way that the mixture is resolved into three fractions, that is, the unsubstituted straight chain paraffin, the monosubstituted derivative and the polysubstituted derivative. Inasmuch as the unsubstituted paraffin forms the strongest plexad, as shown in said application, Serial No. 115,511, the separation is effected by a kind of fractional precipitation procedure. Yet, in view of the fact that the strength of the plexad depends somewhat upon the molecular weight of the straight chain compound, that is, is stronger the higher the molecular weight of the compound being plexated, it is desirable to treat mixtures having a rather narrow range of molecular weights in order to obtain sharp separation between the unsubstituted and mono-substituted straight chain compounds.

The separation between the unsubstituted and mono-substituted compounds having the substituent attached to a non-terminal carbon atom, may be effected by a solvent sweating procedure such as that described in said application, Serial No. 115,511. After freeing the plexad of occluded oil by a solvent washing, gravity settling, centrifuging or the like, the plexad is heated in the presence of a solvent at a moderately elevated temperature of the order of 30–50° C. to effect the selective decomposition of the plexad to urea and monosubstituted compound while leaving the stronger plexad of the unsubstituted compound substantially unchanged. An alternate procedure involves a fractional precipitation of the plexads of the unsubstituted and mono-substituted compounds by means of essentially countercurrent contacting between the urea-solvent mixture and the mixture being treated. The principle of this procedure is based upon the discovery that the unsubstituted compound may be selectively plexated with urea solutions which have urea concentrations below saturation. This is illustrated diagrammatically in Figure 3.

In Figure 3, a narrow cut of a paraffin wax distillate covering a boiling range corresponding to a spread of about six carbon atoms, for example, from $C_{18}$ to $C_{24}$ or $C_{24}$ to $C_{30}$, is introduced into the system through line 31. The wax distillate contains straight chain paraffin wax (plexand), mono-alkyl paraffin wax in which the alkyl group contains less than three carbon atoms and is attached to other than a terminal carbon atom (secondary plexand), and poly-alkyl paraffin (antiplex). The wax distillate is blended with from about 0.2 to about 1.5 volumes of a naphtha fraction (e. g., 100–400° F., boiling range) introduced through lines 32 and 33. Naphtha serves to reduce the viscosity of the wax distillate and thus improves its settling characteristics. The wax-naphtha blend in line 31 is introduced into turbo mixer 35, together with a saturated solution of urea in methanol or in aqueous methanol containing from about 5–20 per cent of water in line 34. The volume of urea solution is so adjusted that the final concentration of urea in the solution leaving mixer 35 is between about 60–85 per cent of its saturation value. In general, from about 0.3–3.0 volumes of urea solution per volume of wax distillate-naphtha solution is employed. Operating temperatures in mixer 35 are maintained at about 20° C. to 40° C., preferably 25–30° C. By so operating, selective plexation of straight chain paraffin waxes takes place in mixer 35, inasmuch as the latter waxes form much stronger plexads than branched-chain waxes.

The mixture of urea solution, urea-plexad, and non-plexated wax distillate in mixer 35 is taken through line 36 into settler 37, in which the non-plexated oily distillate or antiplex forms an upper layer. The latter is taken from settler 37 through line 38 into turbo mixer 39. The slurry of urea plexad in the urea solvent settles to the bottom of settler 37, from which it is pumped out (pump not shown) through line 40, mixed with from about 0.1 to 0.5 volume of naphtha in line 55, and introduced into turbo mixer 41. In mixer 41, the temperature is maintained at about 25° C. to about 40° C. The urea slurry-naphtha mixture in mixer 41 is taken through line 42 to settler 43. Naphtha rises to the top of settler 43 and is withdrawn at the top through line 33 for recycling. Fresh or makeup naphtha, or other suitable solvent, is introduced through line 90 connecting with line 33.

Naphtha-washed slurry is withdrawn from settler 43 through line 44, heat exchanger 45 wherein it is warmed to about 50–60° C., and heater 46 wherein sufficient heat is supplied to decompose the urea-straight chain paraffin wax plexad and to cause redissolution of urea in urea solvent. Temperatures from about 55° C. to about 75° C. in heater 46 are generally sufficient to affect decomposition or reversion of the urea plexad. The decomposed plexad in line 44 is passed into settler 47 wherein molten wax (plexand) forms a top layer and is removed therefrom through line 48. Inasmuch as the wax is contaminated with relatively small amounts of naphtha occluded with the plexad, the molten wax is taken through line 48 to fractionator 49. Naphtha is stripped off in fractionator 49 through overhead line 51, cooler 52 and tank 53. A portion or all of the naphtha in line 51 may be taken through line 54 to fractionator 49 to serve as reflux or another portion or all may be taken through line 51 and line 55 for use in mixer 41. Substantially pure straight chain paraffin wax (plexand) is taken as bottoms from fractionator 49 through line 50.

The wax distillate, substantially free of straight chain paraffin wax, in line 38 is introduced into turbo mixer 39 with recycle urea solution from line 57. (Fresh or makeup urea solution is introduced to the system through line 59.) The urea solution in line 57 contains sufficient suspended urea such that following plexation in mixer 39 the solution is saturated with urea. In mixer 39, the temperature is maintained from about 15° C. to about 30° C., with plexation taking place between urea and mono-alkyl paraffin wax. In some instances, rather weak plexads are formed between the mono-substituted compound and urea; and, in such cases, the temperature of mixer 39 is preferably lowered to from 0 to —15° C., in order to realize complete recovery of the mono-substituted compound. The urea plexad and unplexated wax distillate oil (antiplex) in mixer 39 is taken through line 61 to settler 62. Wax distillate oil forms an upper layer in settler 62 and is withdrawn through line 63 to fractionator 64. Naphtha diluent is removed from wax distillate oil in fractionator 64 and is removed as overhead through line 66, cooler 67 and tank 68. Naphtha so recovered may be recycled in part or in toto through line 69; preferably, however, a portion is taken through line 70 with a division made such that part is taken through line 70 to mixer 71 and part is taken through lines 70, 87 and 55 to mixer 41. Substantially pure wax distillate oil or dewaxed oil (antiplex) is taken as bottoms from fractionator 64 through line 65.

Slurried plexad (urea-monoalkyl wax) is withdrawn from the bottom of settler 62 through line 72 and introduced into turbo mixer 71 with naphtha from line 70. In general, from about 0.1 to about 0.5 volume of naphtha per volume of slurried plexad are introduced from line 70. The slurried plexad is washed free of occluded wax distillate oil with the naphtha in mixer 71, the temperature of the latter being maintained from about 15° C. to about 30° C. The mixture of naphtha, urea solvent and urea plexad in mixer 71 is taken through line 73 to settler 74. Naphtha rises to the top of settler 74 and is removed therefrom through line 32 for recycling to mixer 35. The slurried plexad in settler 74 settles to the bottom and is withdrawn through line 75, passed through heat exchanger 76 (maintained at about 40° C. to 65° C.) and heater 77. In heater 77 which is maintained at about 60° C. to about 70° C. the plexad is decomposed to urea and mono-alkyl paraffin wax. Decomposed plexad is introduced to settler 78 from line 75. In settler 78, urea solution settles to the bottom and is withdrawn through line 57 for recycling to mixer 39. Mono-alkyl paraffin wax rises to the top of settler 78 and is taken through line 79 to fractionator 80, wherein contaminating naphtha is removed overhead through line 82, cooler 83 and tank 84. Recovered naphtha may be recycled in part or in toto through line 85 to fractionator 80, or taken through lines 86, 55 and 40 to mixer 41. Mono-alkyl paraffin wax (secondary plexand) is removed as bottoms from fractionator 80 through line 81.

It will be understood, of course, that a greater degree of purity of the mono-alkyl paraffin wax can be realized by introducing one or more mixing and settling zones between mixers 71 and 35. Similarly, the purity of the straight chain paraffin waxes can be increased by recycling a portion of such waxes to mixer 35, or by dissolving the recovered wax in naphtha solvent and retreating it in a separate concurrent series of mixers such as those described above.

It is to be understood also that the several gravity settlers (37, 43, 62 and 74) may be replaced by other separation means such as centrifuges or rotary filters, etc.

In order to improve the settling characteristics of the plexads and to minimize the amount of occluded oil in the plexads, a relatively small amount, as from 0.05 to 0.5 weight per cent, of a wetting agent or detergent can be added to the urea solvent phase. Typical of such aids are alkylaryl sulfonates, alkyl sulfates (preferably branched chain alkyl sulfates) or secondary alkyl sulfates. For example, a sulfated dodecyl alcohol or a sulfonated castor oil may be so employed.

VII. ILLUSTRATIVE EXAMPLES

The following examples serve to illustrate, and not in any sense limit, the present invention.

(a) Separation of monochlorwax and polychlorwax

A refined grade of paraffin wax (melting point 47° C., average carbon chain length 24) was chlorinated by bubbling chlorine gas through the wax, in molten condition, in the presence of ultraviolet light until it contained an average of twenty-seven weight per cent of chlorine. A relatively small amount of unreacted wax was removed by dewaxing with a benzol-methyl ethyl ketone solvent at 0° C. and filtering off the precipitated wax. The chlorowax freed of unreacted wax comprised 13.3 parts by weight, and was then dissolved in 10.4 parts by weight of iso-octane (2,2,4-trimethyl pentane). The wax iso-octane solution was agitated for 0.5 hours at about 25° C. with 150 parts by volume of a 62.5 per cent aqueous methanol solution saturated with urea, whereupon a plexad was formed. The latter was removed by filtration, washed with pentene and decomposed when contacted with water. The chlorwax recovered from the urea plexad was substantially pure mono-chlorwax. The non-plexated material on further treatment with saturated urea solutions did not form a plexad and was comprised of di- and polychlorwaxes.

(b) Separation of 2-ethylhexyl n-octyl fumarate from di(-2-ethylhexyl) fumarate When agitated with a saturated methanolic solution of urea at about 25° C., 2-ethylhexyl n-octyl fumarate readily forms a plexad. Under similar conditions di(-2-ethylhexyl) fumarate fails to form a plexad. It will be noted that the latter ester contains two non-terminal ethyl groups in the molecule, whereas the first-mentioned ester contains only one such group.

VIII. UTILITY

From the foregoing description, it will be apparent that the invention has considerable application in the chemical and petroleum arts. As indicated previously, a non-terminally monochlorinated straight chain paraffin can be separated from the corresponding non-terminally poly-chlorinated straight chain paraffins, which are formed in the chlorination of straight chain paraffins. The invention is of value also in the separation of monoalkyl-substituted straight chain esters from polyalkyl-substituted esters.

The invention is of particular importance in the petroleum art for, as indicated, the invention is applicable to the separation of monomethyl- and monoethyl-substituted paraffin waxes from the more highly branched paraffin waxes such as occur in waxes obtained from wax distillates or foots oil. Waxes having a large spread in melting point as well as in molecular weight can be segregated into low and high melting point waxes. For example, foots oil can be segregated in this fashion into a wax melting within the commercial paraffin wax range, a low melting point wax suitable as a cracking stock for the production of 1-olefins, and a dewaxed oil.

Halogen compounds can be plexated from mixtures containing the same and form urea plexads, as described above and as described and claimed in application Serial No. 115,511. Compounds characterized by a nitrogen-containing substituent are also plexated from mixtures containing the same and form plexads with urea, as described above; this subject matter is also described and is claimed in application Serial No. 115,515. Sulfur-containing compounds are also plexated from their mixtures, and form plexads with urea, as described above and as described and claimed in application Serial No. 255,943, filed November 3, 1951 as a continuation of application Serial No. 115,516 which has been abandoned. Plexation of compounds containing cyclic substituents, and urea plexads thereof, are described and are claimed in application Serial No. 116,593. Plexation with urea of various terminally substituted compounds from mixtures containing the same and non-terminally substituted compounds, described above, is also described and is claimed in application Serial No. 115,517.

Urea plexation of mixtures containing aliphatic compounds of different degrees of unsaturation is described and is claimed in application Serial No. 115,514; similarly, plexation of mixtures containing aliphatic hydrocarbons of different degrees of unsaturation and urea plexads of such hydrocarbons, are described and are claimed in Serial No. 115,518 and in divisional application thereof Serial No. 266,547, filed January 15, 1952.

Said applications Serial Nos. 115,511; 115,514 through 115,518 and 116,593 were filed concurrently with this application on September 13, 1949.

I claim:

1. The method of separating a straight chain compound represented by general formula (C):

(C) 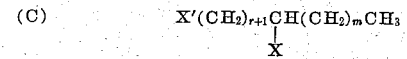

wherein X and X' are monovalent groups the "length" of each of which is less than about 2.3 A°, $r$ and $m$ are integers, and the sum of $r$ and $m$ is greater than four, from a mixture containing the same and a straight chain compound represented by general formula (D):

(D) 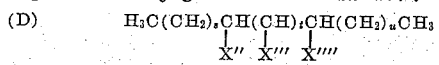

wherein X'', X''' and X'''' are monovalent groups and $s$, $t$ and $u$ are integers the sum of which is greater than four, and wherein at least two of the groups X'', X''' and X'''' are present, which comprises: contacting said mixture with urea under conditions appropriate for the formation of a crystalline complex of urea and said compound (C); and separating said complex from the resulting reaction mixture.

2. The method of separating a straight chain compound represented by general formula (B):

(B) 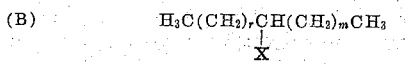

wherein X is a monovalent group the "length" of which is less than about 2.3 A°, $r$ and $m$ are integers, and the sum of $r$ and $m$ is greater than four, from a mixture containing the same and a straight chain compound represented by general formula (D):

(D) 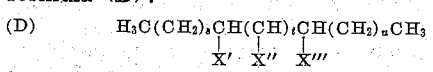

wherein X', X'' and X''' are monovalent groups and $s$, $t$ and $u$ are integers the sum of which is greater than four, and wherein at least two of the groups X', X'' and X''' are present, which comprises: contacting said mixture with urea under conditions appropriate for the formation of a crystalline complex of urea and said compound (B); and separating said complex from the resulting reaction mixture.

3. The method defined by claim 2 wherein X is a monovalent group the "length" of which is between about 2.3 A° and about 2.5 A°, $r$ and $m$ are integers, the sum of $r$ and $m$ is greater than seven, and the sum of $s$, $t$ and $u$ is greater than seven.

4. The method defined by claim 2 wherein X is a monovalent group the "length" of which is between about 2.5 A° and about 2.8 A°, $r$ and $m$ are integers, the sum of $r$ and $m$ is greater than ten, and the sum of $s$, $t$ and $u$ is greater than ten.

5. The method defined by claim 2 wherein X is a monovalent group the "length" of which is between about 2.8 A° and about 3.2 A°, $r$ and $m$ are integers, the sum of $r$ and $m$ is greater than fifteen, and the sum of $s$, $t$ and $u$ is greater than fifteen.

6. The method defined by claim 2 wherein X is a monovalent group the "length" of which is greater than about 3.2 A°, $r$ and $m$ are integers, the sum of $r$ and $m$ is greater than twenty-one, and the sum of $s$, $t$ and $u$ is greater than twenty-one.

7. The method of dewaxing a paraffin wax distillate containing a mono-alkyl paraffin wax in which the alkyl group contains less than three carbon atoms and is attached to other than a terminal carbon atom, and containing a straight chain paraffin wax, which comprises: contacting said paraffin wax distillate with urea under conditions appropriate for the selective formation of a crystalline complex of urea and said straight chain paraffin wax; separating said crystalline complex from the reaction mixture thus formed; contacting said reaction mixture with urea under conditions appropriate for the selective formation of a crystalline complex of urea and said mono-alkyl paraffin wax; separating said last-mentioned crystalline complex from the resulting reaction mixture containing distillate substantially free of paraffin wax.

8. The method of recovering a straight chain paraffin wax and a mono-alkyl paraffin wax in which the alkyl group contains less than three carbon atoms and is attached to other than a terminal carbon atom, from a paraffin wax distillate containing the same, which comprises: contacting said paraffin wax distillate with urea under conditions appropriate for the selective formation of a crystalline complex of urea and said straight chain paraffin wax; separating said complex from the reaction mixture thus formed; decomposing said complex to set free said straight chain paraffin wax and to reconstitute said urea; removing said straight chain paraffin wax; contacting the remainder of said reaction mixture with urea under conditions appropriate for the selective formation of a crystalline complex of urea and said mono-alkyl paraffin wax; separating said last-mentioned complex from the resulting reaction mixture; decomposing said last-mentioned complex to set free said mono-alkyl paraffin wax and to reconstitute said urea; and removing said mono-alkyl paraffin wax.

9. The method of separating a mono-chloro paraffin wax in which the chlorine substituent is attached to other than a terminal carbon atom, from a mixture containing the same and a poly-chloro paraffin wax in which the chlorine substituents are attached to other than terminal carbon atoms, which comprises: contacting said mixture with urea under conditions appropriate for the formation of a crystalline complex of urea and said mono-chloro paraffin wax; and separating said complex from the resulting reaction mixture.

10. The method of separating 2-ethylhexyl, n-octyl fumarate from a mixture containing the same and di-(2-ethylhexyl) fumarate, which comprises: contacting said mixture with urea under conditions appropriate for the formation of a crystalline complex of urea and said 2-ethylhexyl, n-octyl fumarate; and separating said complex from the resulting reaction mixture.

11. Crystalline complex of urea and a disubstituted straight chain compound having one substituent group joined to a terminal carbon atom thereof and having one substituent group joined to other than a terminal carbon atom thereof, said compound having in the chain at least seven carbon atoms and said substituent groups having "lengths" less than about 2.3 A°.

12. The composition defined by claim 11 wherein the compound has in the chain at least ten carbon atoms and said substituent groups have "lengths" between about 2.3 A° and about 2.5 A°.

13. The composition defined by claim 11 wherein the compound has in the chain at least thirteen carbon atoms and said substituent groups have "lengths" between about 2.5 A° and about 2.8 A°.

14. The composition defined by claim 11 wherein the compound has in the chain at least eighteen carbon atoms and said substituent groups have "lengths" between about 2.8 A° and about 3.2 A°.

15. The composition defined by claim 11 wherein the compound has in the chain at least twenty-four carbon atoms and said substituent groups have "lengths" greater than about 3.2 A°.

EVERETT GORIN.

References Cited in the file of this patent

UNITED STATES PATENTS

| Number | Name | Date |
|---|---|---|
| 2,499,820 | Fetterly | Mar. 7, 1950 |

OTHER REFERENCES

Bengen et al., T. O. M. Reel 143, pp. 135–39, May 22, 1946, Trans. Urea Dig.

Bataafsche (Australia) app. n 17339 47 Dec. 31, 1947, Urea Dig.

Zimmerschied et al., Crystalline Adducts of Urea etc., Joint Symposium on Adsorption A. C. S., Sept. 18–23, 1949, pp. 225–40, Urea Dig.

Bengen et al., Experientia 5, part 5, p. 200, May 15, 1949, Urea Dig.